Jan. 18, 1927.

M. T. PETERSON

EXPANDING TOOL

Filed Dec. 12, 1924

1,614,627

Inventor,
Martin T. Peterson;
By A. B. Upham,
Attorney.

Patented Jan. 18, 1927.

1,614,627

UNITED STATES PATENT OFFICE.

MARTIN T. PETERSON, OF BELMONT, MASSACHUSETTS, ASSIGNOR TO BENJAMIN F. LEVY, OF BOSTON, MASSACHUSETTS.

EXPANDING TOOL.

Application filed December 12, 1924. Serial No. 755,420.

This invention relates primarily to reamers, and it has for its object the effecting of means whereby the same can be easily sharpened and a proper amount of clearance allowed, all the blades being equally and automatically ground.

In carrying the invention into effect I provide each of the cutting blades with a tangential adjustment, whereby after they have been ground to a perfectly cylindrical contour, a slight tangential adjustment of each will increase the radius of the cutting edges and diminish the radii of the remaining surfaces, thereby giving the exact and equal clearance for the tool.

Figure 1:
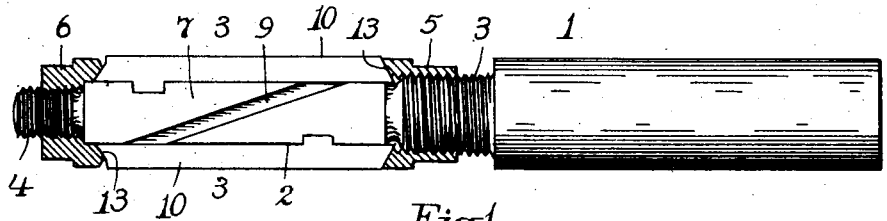
Figure 2:
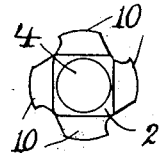
Figure 3:
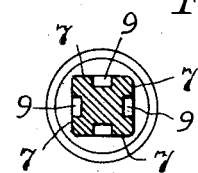
Figure 4:
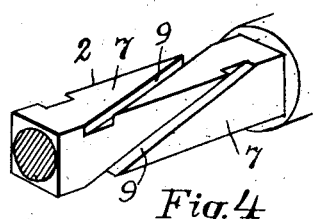
Figure 5:
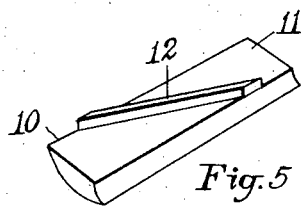
Figure 6:
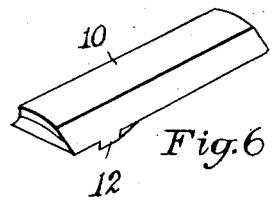
Figure 7:
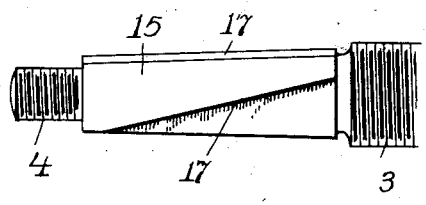
Figure 8:
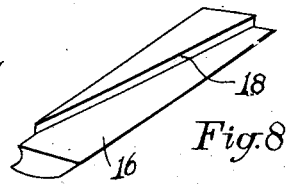
Figure 9:
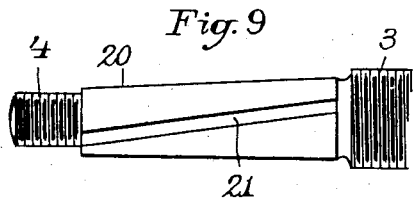
Figure 12:
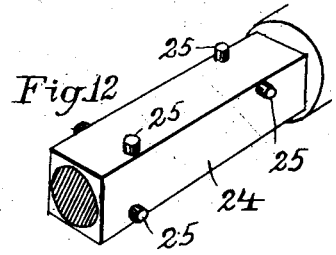
Figure 10:
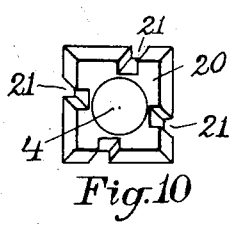
Figure 11:
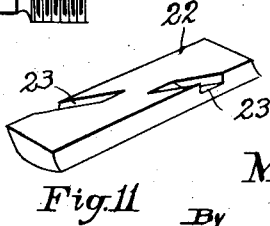

In the drawings forming part of this specification, Fig. 1 shows a reamer embodying my invention, the same being partly in section and with one of the blades removed. Fig. 2 is an end view of the same with an adjusting nut removed. Fig. 3 is a cross section blade-carrying portion of the reamer. Fig. 4 is a perspective view of said portion. Fig. 5 is a perspective view of one of the blades looking at its inner surface. Fig. 6 is a perspective view of the outer surface of a blade. Fig. 7 shows another form of the reamer body. Fig. 8 is an inner view of a modified form of the blade. Fig. 9 shows still another form of the reamer body. Fig. 10 is an end view of the same. Fig. 11 is a perspective view of another modification of the invention. Fig. 12 is a perspective view of the form of body adapted for the blade shown in Fig. 11.

The reamer 1 is provided with a polygonal shank or body 2, preferably square in cross section, and united to the same by a threaded neck 3, the end of the shank terminating in a threaded portion 4. Upon these threaded portions are mounted nuts 5 and 6 respectively, each having the face adjacent the body 2 slightly concaved. Each flat surface 7 of the body is formed with a groove 9 disposed at an acute angle therewith, and each blade 10 has a flat inner surface 11 provided with a tongue 12 also disposed at an acute angle and slidably fitting a groove 9.

The ends of the blades 10 are fitted to enter the overhung edges 13 of the nuts 5 and 6, so that when the latter are screwed firmly against these ends the blades are rigidly confined in place. By retreating one of the nuts and advancing the other, the oblique tongues and grooves 12 and 9 cause the blades to shift laterally to a limited extent.

In sharpening the reamer, it is mounted on lathe-centers in a well known manner and the blades rotated in contact with an emery grinder until their outer surfaces are perfectly cylindrical. The nut 5 is then turned a trifle away from the shank 2, and the nut 6 screwed firmly against the blades, thereby shifting them laterally to throw their cutting edges forward and radially farther out than the remainder of their outer surfaces, and so give the desired clearance.

In the modification illustrated in Figs. 7 and 8, instead of tongues and grooves, the contacting surfaces of the shank 15 and blades 16 are formed with shoulders 17, 18 so disposed as to resist the cutting action of the blades.

Figs. 9 and 10 show a construction wherein the shank 20 is tapered and the grooves 21 therein are less oblique, or nearly parallel with the axis thereof, the tapering arrangement giving the desired increase in diameter.

In the construction shown in Figs. 11 and 12, the blade 22 is formed with limited grooves 23 spaced from each other but in alinement, and the shank 24 is provided with pins 25 engaging the grooves and performing the same function as do the tongues and grooves above described.

It should be noted that not only is the lateral cutting edge of each blade given a clearance by my method of construction, but the terminal cutting edge as well; for, by having the terminal surface slightly inclined relative to the radii thereat, the same lateral adjustment of the blade which gives it clearance at its rear portion will give clearance to the terminal edge. This is important not only for reamers, but also for boring tools as well.

While it is much better to have the surfaces of the shank 2 made flat and the blades correspondingly seated thereon, this is not necessary under certain conditions; for, if the grooves and feathers 9, 12 are made sufficiently deep and wide to stand the strain, the adjacent surfaces of the blades and shank need not touch.

What I claim as my invention is:

1. An expanding tool comprising a body having a holder portion formed with a plurality of flat elongated surfaces, each surface having an obliquely disposed groove therein, a cutting member mounted on each of said flat surfaces having a projection slidably fitting the groove in said surface, said cutting member having a cutting edge and a peripheral surface concentric of the axis of the tool extending back of the cutting edge, means on the holder and engaging the cutting members for longitudinally and equally adjusting said members so that the cutting edges are moved forward into cutting position and the peripheral surfaces are positioned eccentrically of the axis of the tool to give clearance to the cutting edge.

2. An expanding tool comprising a body having a holder portion formed with four flat elongated surfaces, each surface having an obliquely disposed groove therein, a cutting member mounted on each of said flat surfaces having a feather slidably fitting the groove in said surface, said cutting member having a cutting edge and a peripheral surface concentric of the axis of the tool extending back of the cutting edge on the holder and means on the holder engaging the cutting members for longitudinally and equally adjusting said members so that the cutting edges are moved forward into cutting position and the peripheral surfaces are positioned eccentrically of the axis of the tool to give clearance to the cutting edge.

In testimony that I claim the foregoing invention, I have hereunto set my hand this 10th day of December, 1924.

MARTIN T. PETERSON.